(12) United States Patent
Zarrabi

(10) Patent No.: US 12,054,034 B2
(45) Date of Patent: Aug. 6, 2024

(54) BATTERY PROTECTION IN A TRANSPORT REFRIGERATION SYSTEM

(71) Applicant: Carrier Corporation, Palm Beach Gardens, FL (US)

(72) Inventor: Jamal Zarrabi, Les Andelys (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 593 days.

(21) Appl. No.: 17/253,662

(22) PCT Filed: Nov. 21, 2018

(86) PCT No.: PCT/IB2018/001450
§ 371 (c)(1),
(2) Date: Dec. 18, 2020

(87) PCT Pub. No.: WO2020/104828
PCT Pub. Date: May 28, 2020

(65) Prior Publication Data
US 2021/0252949 A1    Aug. 19, 2021

(51) Int. Cl.
*B60H 1/32*        (2006.01)
*B60H 1/00*        (2006.01)
(Continued)

(52) U.S. Cl.
CPC ....... *B60H 1/3232* (2013.01); *B60H 1/00014* (2013.01); *B60H 1/00428* (2013.01);
(Continued)

(58) Field of Classification Search
CPC ............ B60H 1/3232; B60H 1/00428; B60H 1/00014; H02J 7/00304; H02J 7/0031; H02J 7/007; F25D 29/003
(Continued)

(56) References Cited

U.S. PATENT DOCUMENTS 5,001,623 A    3/1991    Magid
5,030,938 A    7/1991    Bondzeit
(Continued)

FOREIGN PATENT DOCUMENTS

CN    106712174 A    5/2017
DE    1926997 A1    1/1971
(Continued)

OTHER PUBLICATIONS

International Search Report mailed Aug. 1, 2019; International Application No. PCT/IB2018/001450; International Filing Date Nov. 21, 2018 (6 pgs).
(Continued)

*Primary Examiner* — Edward Tso
*Assistant Examiner* — Aaron Piggush
(74) *Attorney, Agent, or Firm* — CANTOR COLBURN LLP

(57) ABSTRACT

A transport refrigeration system (20) includes a refrigerant compression device (32), a refrigerant heat rejection heat exchanger (34), an expansion device (36), and a refrigerant heat absorption heat exchanger (38) connected in refrigerant flow communication; a battery (60); a supply line (L1-L3) configured to power an electric device (E1-E3); a switch (S1-S3) connecting the battery (60) to the supply line (L1-L3); a return line (R1-R3) configured to provide a connection to the electric device (E1-E3); a controller (54) configured to open or close the switch (S1-S3) in response at least one of battery voltage and current on at least one of the supply line (L1-L3) and the return line (R1-R3).

16 Claims, 5 Drawing Sheets

(51) Int. Cl.
*F25D 29/00* (2006.01)
*H02J 7/00* (2006.01)

(52) U.S. Cl.
CPC .......... *F25D 29/003* (2013.01); *H02J 7/0031* (2013.01); *H02J 7/007* (2013.01); *H02J 7/00304* (2020.01)

(58) Field of Classification Search
USPC ................................ 320/107, 134, 159, 164
See application file for complete search history.

(56) References Cited

U.S. PATENT DOCUMENTS

| | | | |
|---|---|---|---|
| 5,123,253 A * | 6/1992 | Hanson | F25D 29/003 |
| | | | 236/94 |
| 5,166,595 A | 11/1992 | Leverich | |
| 5,332,958 A | 7/1994 | Sloan | |
| 5,691,619 A | 11/1997 | Vingsbo | |
| 5,993,250 A | 11/1999 | Hayman | |
| 6,362,599 B1 | 3/2002 | Turner et al. | |
| 7,298,113 B2 | 11/2007 | Orikasa | |
| 7,460,344 B2 | 12/2008 | Hastings et al. | |
| 8,775,008 B2 * | 7/2014 | Rini | B60L 58/16 |
| | | | 396/48 |
| 9,156,356 B2 | 10/2015 | Rini et al. | |
| 9,278,619 B2 | 3/2016 | Stadler et al. | |
| 2009/0107743 A1 * | 4/2009 | Alston | B60H 1/00428 |
| | | | 903/906 |
| 2013/0200690 A1 * | 8/2013 | Rini | B60L 3/04 |
| | | | 307/9.1 |
| 2014/0026599 A1 * | 1/2014 | Rusignuolo | F25B 49/025 |
| | | | 62/243 |
| 2014/0252847 A1 | 9/2014 | Yang et al. | |

FOREIGN PATENT DOCUMENTS

| | | |
|---|---|---|
| DE | 102012207769 A1 | 11/2013 |
| GB | 2539863 A | 1/2017 |
| WO | 2018158602 A1 | 9/2018 |

OTHER PUBLICATIONS

Written Opinion mailed Aug. 1, 2019; International Application No. PCT/IB2018/001450; International Filing Date Nov. 21, 2018 (10 pgs).

* cited by examiner

BATTERY PROTECTION IN A TRANSPORT REFRIGERATION SYSTEM

CROSS REFERENCE TO RELATED APPLICATIONS

This application is a National Stage application of PCT/IB2018/001450, filed Nov. 21, 2018, which is incorporated by reference in its entirety herein.

BACKGROUND OF THE DISCLOSURE

The embodiments herein generally relate to transport refrigeration systems and more specifically, to protection of a battery in a transport refrigeration system.

Refrigerated trailers or containers are commonly used to transport perishable goods in a cold chain distribution system. A transport refrigeration system is mounted to the trailer or container in operative association with a cargo space defined within the trailer or container for maintaining a controlled temperature environment within the cargo space.

Conventionally, transport refrigeration systems used in connection with refrigerated trailers or containers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

Existing transport refrigeration systems may include a battery. The battery may be used to provide starting current to an engine that powers a compressor (either mechanically or through a generator). The battery may also store power in engineless transport refrigeration systems. The battery may also power one or more electric devices, such as data loggers, communications devices, temperature probes, etc. Battery powered electric devices may be collectively isolated with a master switch/breaker and also individually protected with individual fuses. This configuration can be cumbersome due to (i) technician time to verify and install the proper fuses and (ii) disconnection of all electronic devices in the event of an overcurrent at the master switch/breaker.

BRIEF DESCRIPTION

According to one embodiment, a transport refrigeration system includes a refrigerant compression device, a refrigerant heat rejection heat exchanger, an expansion device, and a refrigerant heat absorption heat exchanger connected in refrigerant flow communication; a battery; a supply line configured to power an electric device; a switch connecting the battery to the supply line; a return line configured to provide a connection to the electric device; a controller configured to open or close the switch in response at least one of battery voltage and current on at least one of the supply line and the return line.

In addition to one or more of the features described above, or as an alternative, further embodiments of the system may include wherein the controller is configured to close the switch, send a detection signal on the supply line and open the switch in response to a lack of current on at least one of the supply line and the return line.

In addition to one or more of the features described above, or as an alternative, further embodiments of the system may include wherein the controller is configured to monitor the battery voltage and open the switch in response to the battery voltage being less than a first battery threshold.

In addition to one or more of the features described above, or as an alternative, further embodiments of the system may include wherein after opening the switch, the controller is configured to monitor the battery voltage and close the switch in response to the battery voltage being greater than a second battery threshold.

In addition to one or more of the features described above, or as an alternative, further embodiments of the system may include wherein the second battery threshold is greater than the first battery threshold.

In addition to one or more of the features described above, or as an alternative, further embodiments of the system may include wherein the controller is configured to close the switch, monitor the current on at least one of the supply line and the return line and keep the switch closed if the current is less than a first current threshold.

In addition to one or more of the features described above, or as an alternative, further embodiments of the system may include wherein the controller is configured to open the switch after a first delay if the current on at least one of the supply line and the return line is greater than the first current threshold and less than a second current threshold.

In addition to one or more of the features described above, or as an alternative, further embodiments of the system may include wherein the controller is configured to open the switch after a second delay if the current on at least one of the supply line and the return line is greater than the second current threshold and less than a third current threshold.

In addition to one or more of the features described above, or as an alternative, further embodiments of the system may include wherein the controller is configured to open the switch immediately if the current on at least one of the supply line and the return line is greater than the third current threshold.

In addition to one or more of the features described above, or as an alternative, further embodiments of the system may include a second supply line configured to power a second electric device; a second switch connecting the battery to the second supply line; a second return line configured to provide a connection to the second electric device; wherein the current comprises a sum of the current on at least one of the supply line and the return line and a second current on at least one of the second supply line and the second return line.

In addition to one or more of the features described above, or as an alternative, further embodiments of the system may include wherein opening the switch comprises opening one of the switch and the second switch in response to the current and the second current.

According to another embodiment, a method for providing battery protection in a transport refrigeration system includes connecting a battery to a switch, the switch configured to connect the battery to a supply line configured to power an electric device; providing a return line to provide a connection to the electric device; opening or closing the switch in response at least one of battery voltage and current on at least one of the supply line and the return line.

In addition to one or more of the features described above, or as an alternative, further embodiments of the method may include closing the switch, sending a detection signal on the supply line and opening the switch in response to a lack of current on at least one of the supply line and the return line.

In addition to one or more of the features described above, or as an alternative, further embodiments of the method may include monitoring the battery voltage and opening the switch in response to the battery voltage being less than a first battery threshold.

In addition to one or more of the features described above, or as an alternative, further embodiments of the method may include after opening the switch, monitoring the battery voltage and closing the switch in response to the battery voltage being greater than a second battery threshold.

In addition to one or more of the features described above, or as an alternative, further embodiments of the method may include the second battery threshold is greater than the first battery threshold.

In addition to one or more of the features described above, or as an alternative, further embodiments of the method may include closing the switch, monitoring the current on at least one of the supply line and the return line and keeping the switch closed if the current is less than a first current threshold.

In addition to one or more of the features described above, or as an alternative, further embodiments of the method may include opening the switch after a first delay if the current on at least one of the supply line and the return line is greater than the first current threshold and less than a second current threshold.

In addition to one or more of the features described above, or as an alternative, further embodiments of the method may include opening the switch after a second delay if the current on at least one of the supply line and the return line is greater than the second current threshold and less than a third current threshold.

In addition to one or more of the features described above, or as an alternative, further embodiments of the method may include opening the switch immediately if the current on at least one of the supply line and the return line is greater than the third current threshold.

Technical effects of embodiments of the present disclosure include the ability to automatically control power to supply lines in response to the presence or absence of electric devices in a transport refrigeration system. Technical effects further include the ability to avoid under-voltage and over-current conditions using switches to collectively or individually disconnect electric devices from a battery in a transport refrigeration system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
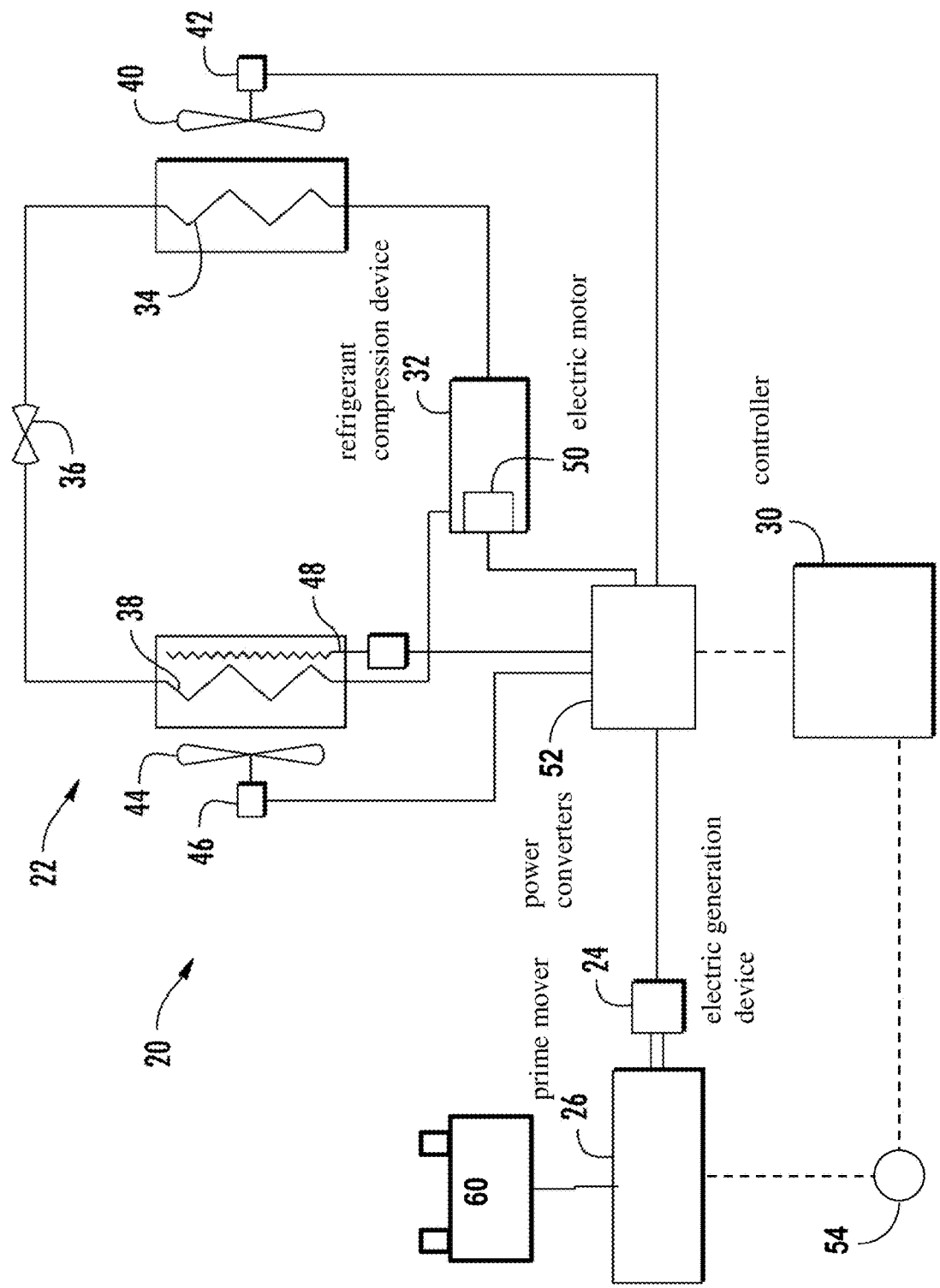
FIG. 1 depicts a transport refrigeration system in an example embodiment.

Referring to FIG. 1, a transport refrigeration system 20 includes a refrigeration unit 22, an electric generation device 24, a prime mover 26 for driving the electric generation device 24, and a controller 30. The refrigeration unit 22 functions, under the control of the controller 30, to establish and regulate a desired product storage temperature within a refrigerated cargo space wherein a perishable product is stored during transport and to maintain the product storage temperature within a specified temperature range. The refrigerated cargo space may be the cargo space of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo space across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo space. It is to be understood that the term "air" when used herein with reference to the atmosphere within the cargo space includes mixtures of air with other gases, such as for example, but not limited to, nitrogen or carbon dioxide, sometimes introduced into a refrigerated cargo space for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The refrigeration system 20 also includes a controller 30 configured for controlling operation of the refrigeration system 20 including, but not limited to, operation of various components of the refrigerant unit 22 to provide and maintain a desired thermal environment within the cargo space of the truck or container, that is within the temperature controlled space in which a perishable product is stowed. The controller 30 may be an electronic controller including a microprocessor and an associated memory bank. The controller 30 controls operation of various components of the refrigerant unit 22, such as the refrigerant compression device 32 and its associated drive motor 50, the fan motors 42, 46 and the electric resistance heater 48. The controller 30 may also be also to selectively operate the prime mover 26, typically through an electronic engine controller 54 operatively associated with the prime mover 26.

The prime mover 26, which comprises an on-board fossil-fuel engine, most commonly a diesel engine, drives the electric generation device 24 that generates electrical power. The drive shaft of the engine drives the shaft of the electric generation device 24. In an electrically powered embodiment of the transport refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate.

A battery 60 may be used to provide starting current to the prime mover 26. The battery 60 may also be used to power optional equipment in the form of electric devices (e.g., data loggers, communications devices, temperature probes, etc.). In other embodiments, the prime mover 26 and electric generation device 24 are eliminated in an engineless configuration. In the engineless embodiments, the battery 60 provides power to the refrigeration system 20 and is charged by regenerative elements, shore power, etc. It is understood that the battery 60 may include multiple battery banks electrically connected.

Figure 2:
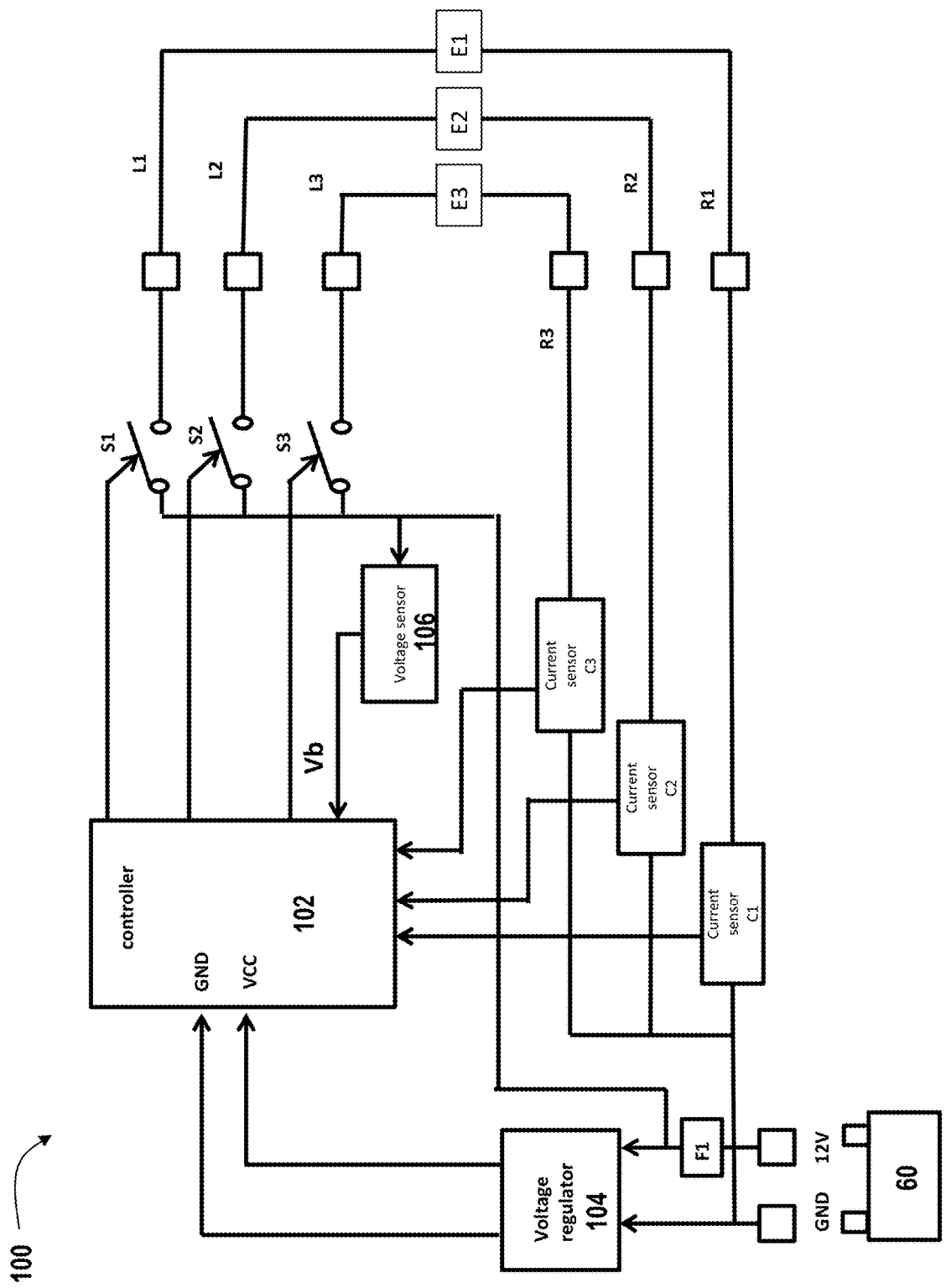
FIG. 2 depicts a battery protection system in an example embodiment.

FIG. 2 depicts a battery protection system 100 in an example embodiment. The battery protection system 100 includes a controller 102, which may the implemented by the controller 30 of FIG. 1. Battery 60 is connected to a voltage regulator 104 through a fuse F1. Power output from the voltage regulator 104 (e.g., 5 volts DC) is used to power the controller 102.

The positive terminal of the battery 60 is also connected to one or more switches S1-S3 through fuse F1. Although three switches are shown in FIG. 2, it is understood that any number switches may be used depending on the system configuration. The controller 102 is configured to control the switches S1-S3 to open or close, as disclosed in further detail herein. The switches S1-S3 may be transistors, relays, SCRs, etc. that are controllable by a control signal from the controller 102.

Each of the switches S1-S3 is connected to a supply line L1-L3. The supply lines L1-L3 provide DC power from the battery 60 to electric devices E1-E3 that may be used as part of the transport refrigeration system. The electric devices E1-E3 may be referred to as options, such as data loggers, communications devices, temperature probes, etc. Returns lines R1-R3 provide the ground connection for the electric devices E1-E3 to the negative terminal of the battery 60.

A voltage sensor 106 detects the battery 60 voltage, Vb, and provides the sensed battery voltage to the controller 102. The voltage sensor 106 may be positioned at the input terminals of the switches S1-S3. A current sensor C1-C3 is located on each return line R1-R3 to sense current drawn by the electric devices E1-E3. The sensed current from the current sensors C1-C3 is provided to the controller 102. The current sensors C1-C3 may be located on the supply lines S1-S3, or any other location where current drawn by the electric devices E1-E3 can be monitored.

Figure 3:
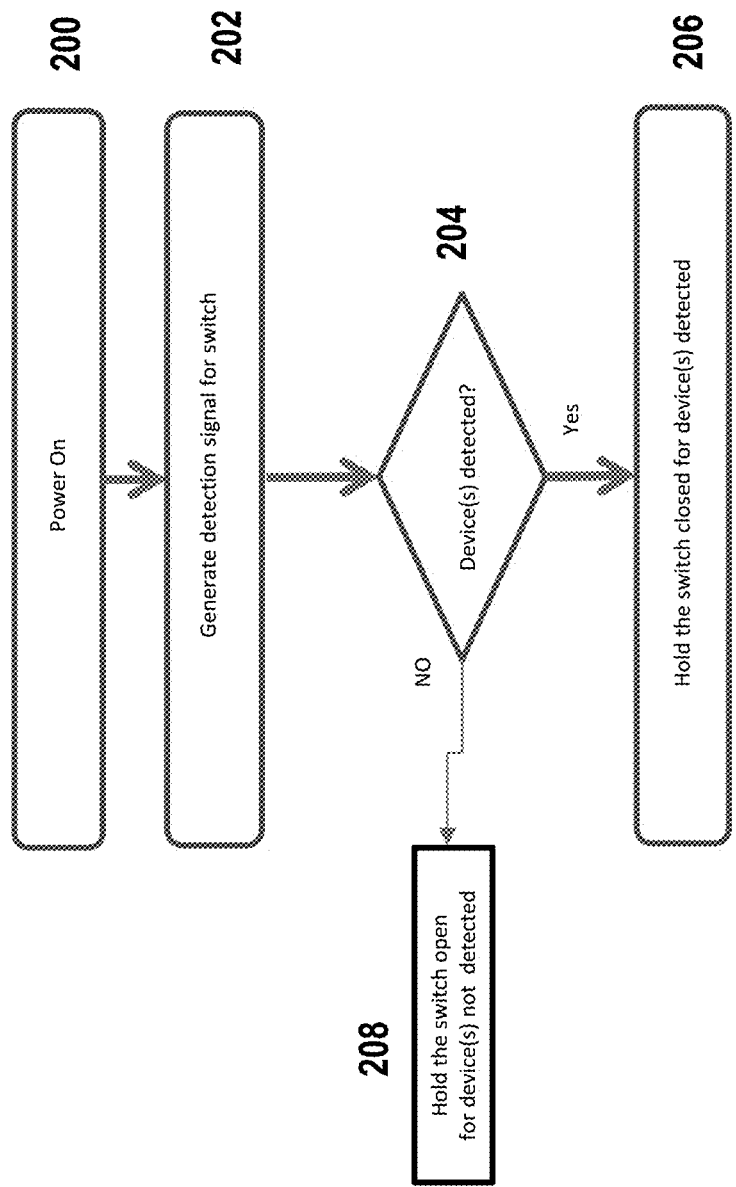
FIG. 3 depicts a process for detecting electric devices in an example embodiment.

In operation, the battery protection system 100 provides multiple protection processes. FIG. 3 depicts a process for detecting electric devices E1-E3 in an example embodiment and controlling switches S1-S3 in response to whether an electric device E1-E3 is present. Some users of the transport refrigeration system may unplug or remove one or more of electric devices E1-E3. In this situation, there is a risk of a fuse/breaker tripping or of electrical arcing. The process of FIG. 3 confirms that an electric device E1-E3 is present and controls switches S1-S3 accordingly.

The process begins at 200 where the battery protection system is powered on. At 202, a detection signal is generated for each switch S1-S3. The detection signal may be a pulse generated by the controller 102. The detection signal is transmitted to each switch S1-S3, with switches S1-S3 closed. At 204, the controller 102 determines if a current is detected by each of the current sensors C1-C3. If a current is present, this indicates that an electric device E1-E3 is installed. For example, if a current is detected at current sensor C1, the controller 102 knows that electronic device E1 is installed. The controller 102 selectively keeps the switches S1-S3 closed if a respective current is detected, as shown at 206. If a current is not present, this indicates that an electric device E1-E3 is not installed and controller 102 selectively opens the switches S1-S3 if a respective current is not detected, as shown at 208.

Figure 4:
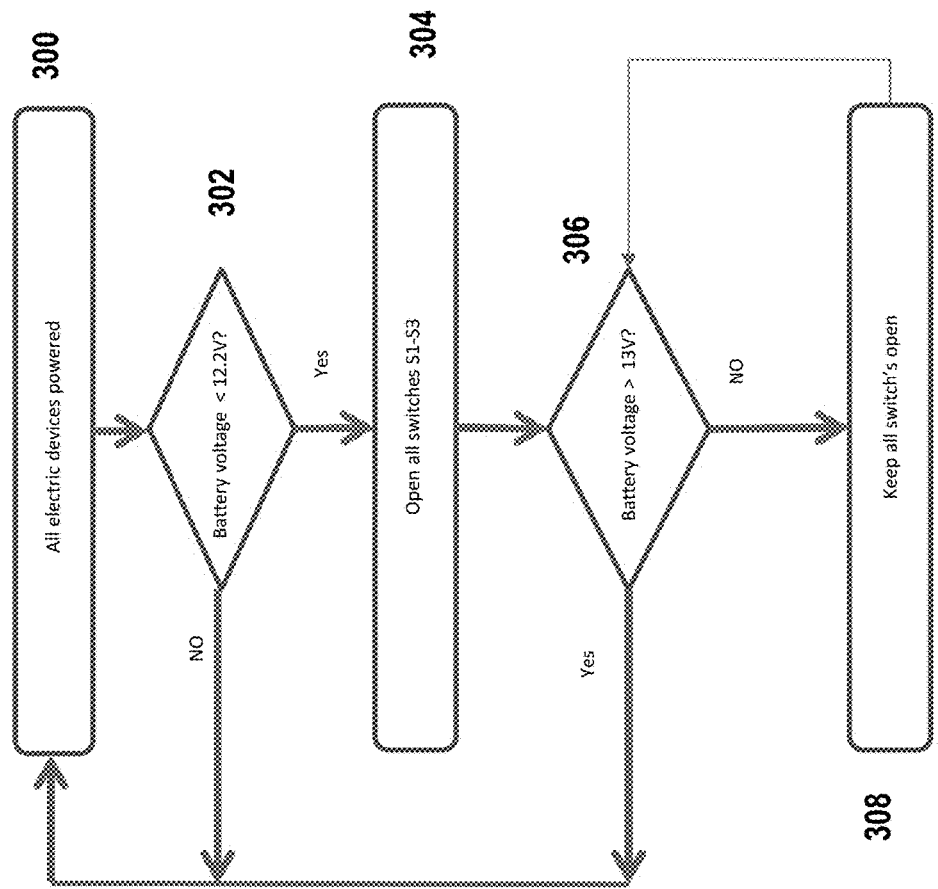
FIG. 4 depicts a process for battery voltage protection in an example embodiment.

FIG. 4 depicts a process for battery voltage protection in an example embodiment. For the battery 60 to provide sufficient power to start the prime mover 26, the voltage should be maintained at a predetermined level. The process of FIG. 4 controls switches S1-S3 in response to battery voltage. The process begins at 300 where switches S1-S3 that are connected to an electric device E1-E3 are closed and the electric devices E1-E3 are powered by the battery 60. At 302, the controller 102 compares the battery voltage from voltage sensor 106 to a first voltage threshold (e.g., 12.2 volts). If the battery voltage is not less than the first voltage threshold, flow returns to 300. If the battery voltage is less than the first voltage threshold, flow proceeds to 304 where the controller 102 sends a control signal to switches S1-S3 to open. The process may pause for a time delay (e.g., 1 minute) before flowing to 306 where the controller 102 determines if the battery voltage is greater than a second voltage threshold (e.g., 13.3 volts). If the battery voltage is greater than the second voltage threshold, flow proceeds to 300 where the switches S1-S3 that are coupled to an electric device E1-E3 may be closed. If the battery voltage is not greater than the second voltage threshold, flow proceeds to 308 where the switches S1-S3 remain open until the battery voltage is greater than the second voltage threshold.

Figure 5:
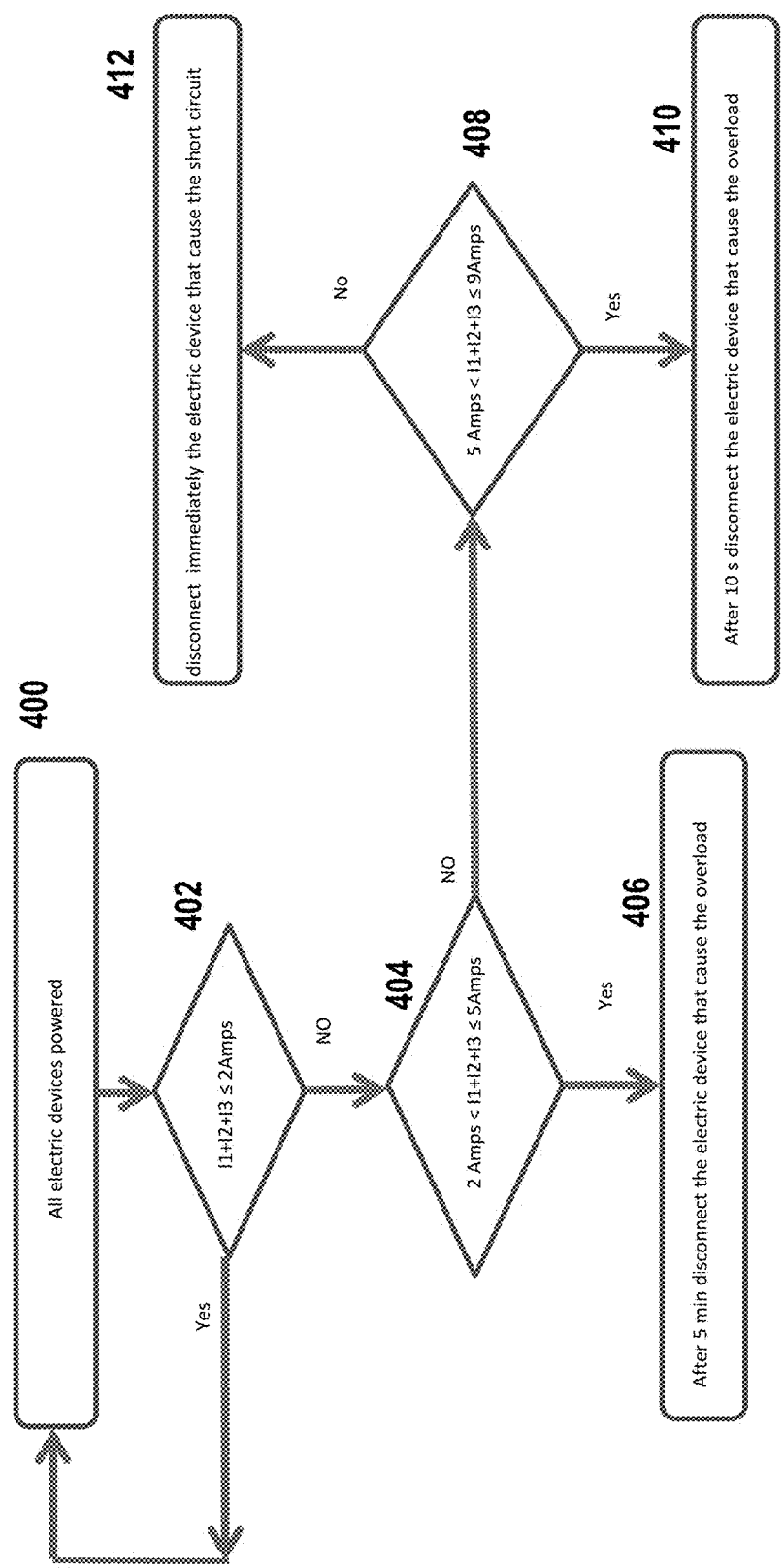
FIG. 5 depicts a process for battery current protection in an example embodiment.

FIG. 5 depicts a process for battery current protection in an example embodiment. The process of FIG. 5 controls switches S1-S3 in response to current. The process begins at 400 where the switches S1-S3 that are connected to an electric device E1-E3 are closed and the electric devices E1-E3 are powered by the battery 60. At 402, the controller receives sensed current from each of the current sensors C1-C3 and compares the sum of the sensed current from each of the current sensors C1-C3 to a first current threshold (e.g., 2 Amps). If the sum of the sensed current from each of the current sensors C1-C3 is less than or equal to the first current threshold, then the system is operating normally and flow returns to 400.

If at 402, the sum of the sensed current from each of the current sensors C1-C3 is not less than or equal to the first current threshold, flow proceeds to 404 where the controller 102 determines if the sum of the sensed current from each of the current sensors C1-C3 is greater than the first current threshold and less than or equal to a second current threshold (e.g., 5 Amps). If so, flow proceeds to 406 where the controller 102 pauses for a first delay (e.g., 5 minutes) and if the sum of the sensed current from each of the current sensors C1-C3 is still greater than the first current threshold and less than or equal to a second current threshold, the controller 102 disconnects the electric device(s) E1-E3 that is causing the current overload. The controller 102 opens the switch(es) S1-S3 corresponding to the electric device(s) E1-E3 causing the over-current situation.

If at 404, the sum of the sensed current from each of the current sensors C1-C3 is greater than second current threshold, flow proceeds to 408 where the controller 102 determines if the sum of the sensed current from each of the current sensors C1-C3 is greater than the second current threshold and less than or equal to a third current threshold (e.g., 9 Amps). If so, flow proceeds to 410 where the controller 102 pauses for a second delay (e.g., 10 seconds) and if the sum of the sensed current from each of the current sensors C1-C3 is greater than the second current threshold and less than or equal to a third current threshold, the controller 102 disconnects the electric device(s) E1-E3 that is causing the current overload. The controller 102 opens the switch(es) S1-S3 corresponding to the electric device(s) E1-E3 causing the over-current situation.

If at 408, the sum of the sensed current from each of the current sensors C1-C3 is greater than third current threshold, flow proceeds to 412 where the controller 102 immediately disconnects the electric device(s) E1-E3 that is causing the current overload. The controller 102 opens the switch(es) S1-S3 corresponding to the electric device(s) E1-E3 causing the over-current situation.

Embodiments of the disclosure provide for automatic detection of installed electric devices. This elements the need for a technician to install a fuse for each the electric devices. If an electric device is not present on a supply line, the corresponding switch is opened to prevent arcing from the supply line to other components. If the case of over-current situations, only the electric device causing the over-current is disconnected, rather than a fuse/breaker disrupting power to all installed electric devices.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A transport refrigeration system comprising:
   a refrigerant compression device, a refrigerant heat rejection heat exchanger, an expansion device, and a refrigerant heat absorption heat exchanger connected in refrigerant flow communication;
   a battery;
   a supply line configured to power an electric device;
   a switch connecting the battery to the supply line;
   a return line configured to provide a connection to the electric device;
   a controller configured to open or close the switch in response to at least one of battery voltage and current on at least one of the supply line and the return line;
   wherein the controller is configured to close the switch, monitor the current on at least one of the supply line and the return line and keep the switch closed if the current is less than a first current threshold;
   wherein the controller is configured to open the switch after a first delay if the current on at least one of the supply line and the return line is greater than the first current threshold and less than a second current threshold;
   wherein the controller is configured to open the switch after a second delay if the current on at least one of the supply line and the return line is greater than the second current threshold and less than a third current threshold.

2. The transport refrigeration system of claim 1 wherein:
   the controller is configured to close the switch, send a detection signal on the supply line and open the switch in response to a lack of current on at least one of the supply line and the return line.

3. The transport refrigeration system of claim 1 wherein:
   the controller is configured to monitor the battery voltage and open the switch in response to the battery voltage being less than a first battery threshold.

4. The transport refrigeration system of claim 3 wherein:
   the second battery threshold is greater than the first battery threshold.

5. The transport refrigeration system of claim 1 wherein:
   the controller is configured to open the switch immediately if the current on at least one of the supply line and the return line is greater than the third current threshold.

6. The transport refrigeration system of claim 1 further comprising:

a second supply line configured to power a second electric device;

a second switch connecting the battery to the second supply line;

a second return line configured to provide a connection to the second electric device;

wherein the current comprises a sum of the current on at least one of the supply line and the return line and a second current on at least one of the second supply line and the second return line.

7. The transport refrigeration system of claim 6 wherein:

opening the switch comprises opening one of the switch and the second switch in response to the current and the second current.

8. A transport refrigeration system comprising:

a refrigerant compression device, a refrigerant heat rejection heat exchanger, an expansion device, and a refrigerant heat absorption heat exchanger connected in refrigerant flow communication;

a battery;

a supply line configured to power an electric device;

a switch connecting the battery to the supply line;

a return line configured to provide a connection to the electric device;

a controller configured to open or close the switch in response to at least one of battery voltage and current on at least one of the supply line and the return line;

wherein the controller is configured to monitor the battery voltage and open the switch in response to the battery voltage being less than a non-zero first battery threshold;

wherein after opening the switch, the controller is configured to monitor the battery voltage and close the switch in response to the battery voltage being greater than a non-zero second battery threshold.

9. The transport refrigeration system of claim 8 wherein:

the second battery threshold is greater than the first battery threshold.

10. A method for providing battery protection in a transport refrigeration system, the method comprising:

connecting a battery to a switch, the switch configured to connect the battery to a supply line configured to power an electric device;

providing a return line to provide a connection to the electric device;

opening or closing the switch in response to at least one of battery voltage and current on at least one of the supply line and the return line;

closing the switch, monitoring the current on at least one of the supply line and the return line and keeping the switch closed if the current is less than a first current threshold;

opening the switch after a first delay if the current on at least one of the supply line and the return line is greater than the first current threshold and less than a second current threshold;

opening the switch after a second delay if the current on at least one of the supply line and the return line is greater than the second current threshold and less than a third current threshold.

11. The method of claim 10 further comprising:

closing the switch, sending a detection signal on the supply line and opening the switch in response to a lack of current on at least one of the supply line and the return line.

12. The method of claim 10 further comprising:

monitoring the battery voltage and opening the switch in response to the battery voltage being less than a first battery threshold.

13. The method of claim 12 wherein:

the second battery threshold is greater than the first battery threshold.

14. The method of claim 10 further comprising:

opening the switch immediately if the current on at least one of the supply line and the return line is greater than the third current threshold.

15. A method for providing battery protection in a transport refrigeration system, the method comprising:

connecting a battery to a switch, the switch configured to connect the battery to a supply line configured to power an electric device;

providing a return line to provide a connection to the electric device;

opening or closing the switch in response to at least one of battery voltage and current on at least one of the supply line and the return line;

monitoring the battery voltage and opening the switch in response to the battery voltage being less than a non-zero first battery threshold;

after opening the switch, monitoring the battery voltage and closing the switch in response to the battery voltage being greater than a non-zero second battery threshold.

16. The method of claim 15 wherein:

the second battery threshold is greater than the first battery threshold.

* * * * *